United States Patent Office 3,326,344
Patented June 20, 1967

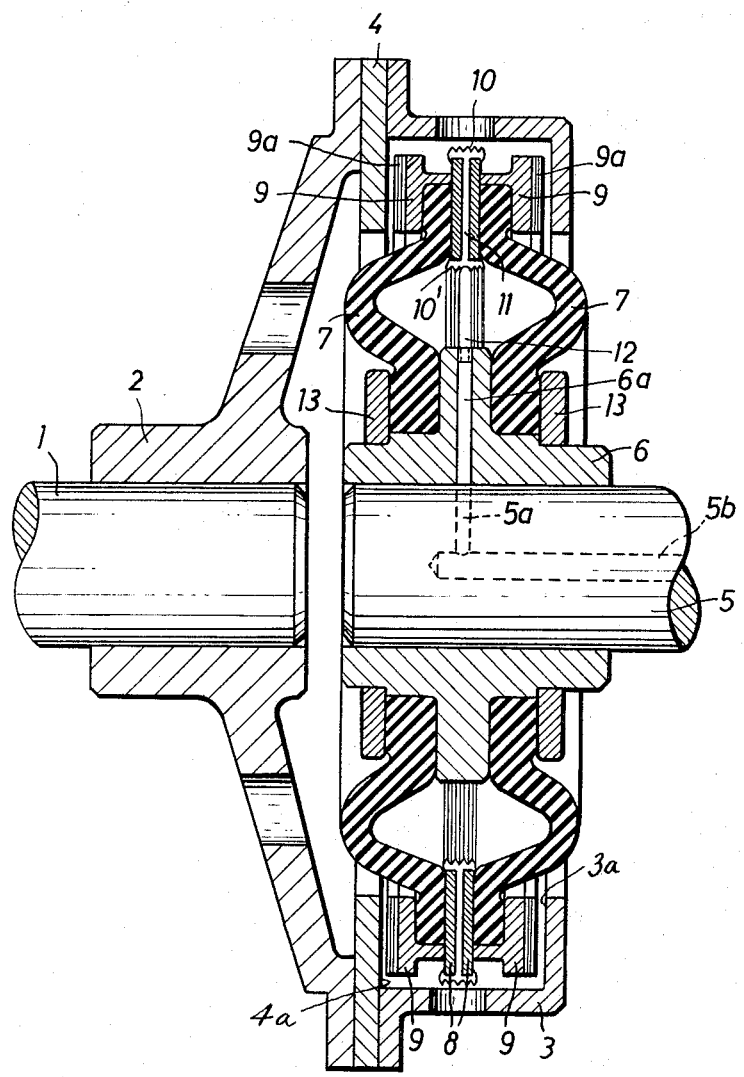

3,326,344
FLUID OPERATED FLEXIBLE CLUTCH
Bernhard Hackforth, Heerstrasse 58,
Wanne-Eickel, Germany
Filed May 19, 1965, Ser. No. 456,996
6 Claims. (Cl. 192—88)

My invention relates to shaft clutch assemblies and more particularly to flexible shaft clutch assemblies.

In known disc or plate clutch assemblies, the clutch members connected to the driving and driven shafts that are to be clutched together must be accurately and without variation aligned with one another. The clutch members are therefore of rigid construction and cannot shift relatively to one another. They therefore do not tolerate any movement of the shafts from their axially aligned relationship.

When it is required to clutch a non-flexibly mounted shaft to the shaft of a flexibly or resiliently mounted prime mover, however, a resilient coupling must be provided which allows some angular and linear relative displacement of the shafts. A great number and wide variety of resilient couplings of this kind are known. In one known coupling which provides great flexibility in all directions, torque is transmitted by a ring-shaped disc which has a number of convexities on one side and is made, for instance, of fiber-reinforced or fabric-reinforced rubber, the inner edge of the disc being secured to one coupling member and the outer edge of the disc being secured to the other coupling member. Couplings having two parallel ring discs have been used for the transmission of heavy torques. Unfortunately couplings of this kind provide a permanent connection between the ends of two shafts, i.e. they are fixed couplings and not clutches which are selectively engageable or disengageable.

There is a known resilient shaft clutch however which comprises a hollow resilient annular member that is adapted to be expanded axially by the introduction therein of pressurized fluid, the annular member having its inner edge fixed to a hub, which forms one clutch member and has a fluid supply duct through it, and having, at its outer edge, friction linings which are surrounded by the other clutch member and which come into engagement with the other clutch member when the annular member is expanded.

In the previous clutches of this known kind, the annular member is of U-shaped cross section with the arms of the U directed inwards and hermetically sealed at their ends to the hub. The whole of the U-shaped section is then expanded by the introduction of fluid under pressure into it so that the whole section expands laterally and friction linings fixed near the roots of both arms of the U move apart from each other into engagement with friction surfaces on the other clutch member.

In this previously known clutch, the friction linings are fixed to rigid annular rings mounted on the U-shaped section and these rings slide axially on the outside edges of clamping rings by which the arms of the U-shaped section are clamped to the hub. The clutch is therefore radially resilient but, so far as relative angular displacements of the clutched shafts are concerned, the clutch either does not permit such displacements at all or, if it can tolerate them, does so with the result that at least one of the friction linings on the resilient central member becomes askew relative to the friction surface of the other clutch member with which it engages so that only correspondingly reduced portions of the linings make contact with their matching surfaces. When the shafts move axially relative to each other, one friction lining is consequently inclined to disengage from its matching surface and therefore impair transmission.

It is an object of my invention to obviate the disadvantages of the last-mentioned and other known clutches and to provide a shaft clutch assembly which can tolerate relative displacements of the shafts in all directions whether the clutch is engaged or disengaged and without detriment to the transmission between the two clutch members.

To this end and in accordance with the present invention, I provide a resilient shaft clutch assembly wherein the annular member, instead of being of U-shaped section, comprises two annular discs arranged face to face with an annular gap between them, the gap being closed around its periphery by a resilient wall which stretches axially when the annular member is expanded.

Since the outer edges of the two resilient discs are interconnected by the resilient wall, the friction linings, which in this case are carried on the outside faces of the discs, are free to move independently of each other so that both can come into full engagement with the friction surfaces on the other clutch member when the annular member is expanded. The friction linings thus transmit the torque between the two shafts over their full surface areas of engagement.

Preferably, the gap between the two discs is not exposed entirely to the fluid under pressure, but instead, an annular portion of the gap within the resilient wall around the periphery of the disc is closed by a second resilient wall which stretches axially when the annular member is expanded, and the pressurized fluid is conducted to the space between the two resilient walls by a flexible tube leading from a duct in the hub. Only small quantities of fluid under pressure are therefore required and the clutch response time is therefore not increased because of any necessity for increasing the pressure in the entire space between the two discs.

Other features which are considered as characteristic for the invention are set forth in the appended claims.

Although the invention is illustrated and described herein as embodied in a shaft clutch assembly, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of a specific embodiment thereof when read in connection with the accompanying single figure of drawings showing the shaft clutch assembly of my invention in axial section.

The clutch assembly shown in the drawing couples shafts 1 and 5. A sleeve 2 having a radial flange is fixed on the shaft 1 and carries a clutch housing 3, 4. The housing parts 3 and 4 are provided with friction surfaces 3a, 4a respectively facing one another or may carry friction linings. Extending between these friction surfaces 3a, 4a are the outer edge portions of two resilient discs 7 whose inner edges are secured by clamping rings 13 to a hub 6 which is fixed to the shaft 5. The hub 6 is formed with a radial passage 6a extending between the discs 7 and communicating through a registering radial bore 5a in the shaft 5 with an axial passage 5b formed therein. A pressurized fluid can be supplied to and removed from the space between the discs 7 through these various passages and bores. The outer edges of the discs 7 are respectively clamped between pairs of rigid rings 8 and 9. Each of the rings 9 carries a friction lining 9a. The rings 8 have between them an annular gap 11 which is sealed externally and internally by an annular bellows member having an outer peripheral flexible wall 10 and an inner peripheral flexible wall 10' secured to the rings 8. The gap 11 communicates with the passage 6a through a flexible tube 12.

When pressurized fluid is introduced into the gap 11 through the tube 12, the bellows member expands stretching the flexible walls 10, 10' and displacing the discs 7 in opposite directions of the hub axis from the non-clutching position shown in the figure to a clutching position in which the friction linings 9a engage the friction surfaces 3a, 4a.

The discs 7 are prestressed towards one another so that restoring springs are unnecessary. Consequently, when the pressure fluid in the gap is discharged therefrom, the discs 7 automatically disengage the friction linings 9a from the corresponding surfaces 3a, 4a and return to the nonclutching position shown in the figure.

I claim:

1. A shaft clutch assembly comprising a pair of clutch members, one of said clutch members including a hub having a longitudinal axis and a hollow resilient annular member having an inner peripheral edge coaxially fixed to said hub, said hollow annular member comprising a pair of resilient annular discs located in spaced face to face relation to each other so as to define an annular gap therebetween, said resilient annular discs being yieldable in the direction of the hub axis and in directions radial thereto, wall means extending between outer peripheral edge portions of said annular discs and closing said annual gap, said wall means being resiliently stretchable in the direction of the hub axis, and friction lining means mounted on said annular discs, said hollow annular member being adapted to receive pressurized fluid in said annular gap for expanding said hollow annular member in the direction of said hub axis, said other of said clutch members surrounding said friction lining means and being engageable thereby for frictionally locking therewith when said hollow annular member is expanded.

2. A shaft clutch assembly including a pair of clutch members, one of said clutch members comprising a hub having a longitudinal axis, a pair of flexible annular discs located in spaced face to face relation to each other so as to define an annular gap therebetween, said annular discs having a respective inner edge portion fixed to said hub and a respective outer edge portion and being yieldable in the direction of the hub axis and in direction radial thereto, flexible wall means extending between said outer edge portions of said discs and closing said annular gap, friction lining means mounted on said outer edge portions, and means for introducing pressurized fluid to said annular gap for displacing said discs and stretching said flexible wall means in opposite directions of said hub axis, said other of said clutch members surrounding said friction lining means and being engageable thereby for frictionally locking therewith when said discs are displaced in said opposite directions of said hub axis.

3. A shaft clutch assembly including a pair of clutch members, one of said clutch members comprising a hub having a longitudinal axis, a pair of flexible annular discs located in spaced face to face relation to each other so as to define an annular gap therebetween, said annular discs having a respective inner edge portion fixed to said hub and a respective outer edge portion and being yieldable in the direction of the hub axis and in directions radial thereto, flexible wall means connecting said outer edge portions of said discs and closing said annular gap, said flexible wall means comprising an annular bellows member having an outer and an inner peripheral flexible wall defining, with the outer edge portions of said discs, said annular gap therebetween, friction lining means mounted on said outer edge portions, and means for introducing pressurized fluid to said annular gap for displacing said discs and stretching said flexible wall means in opposite direction of said hub axis, said other of said clutch members surrounding said friction lining means and being engageable thereby for frictionally locking therewith when said discs are displaced in said opposite directions of said hub axis.

4. A shaft clutch assembly including a pair of clutch members, one of said clutch members comprising a hub having a longitudinal axis, a pair of flexible annular discs located in spaced face to face relation to each other so as to define an annular gap therebetween, said annular discs having a respective inner edge portion fixed to said hub and a respective outer edge portion and being yieldable in the direction of the hub axis and in directions radial thereto, flexible wall means extending between said outer edge portions of said discs and closing said annular gap, friction lining means mounted on said outer edge portions, and means for introducing pressurized fluid to said annular gap for displacing said discs and stretching said flexible wall means in opposite directions of said hub axis, said fluid introducing means comprising a fluid supply duct formed in said hub and a flexible tube connecting said duct to said annular gap, said other of said clutch members surrounding said friction lining means and being engageable thereby for frictionally locking therewith when said discs are displaced in said opposite direction of said hub axis.

5. A shaft clutch assembly including a pair of clutch members, one of said clutch members comprising a hub having a longitudinal axis, a pair of flexible annular discs located in spaced face-to-face relation to each other so as to define an annular gap therebetween, said annular discs having a respective inner edge portion fixed to said hub and a respective outer edge portion, flexible wall means extending between said outer edge portions of said discs and closing said annular gap, friction lining means mounted on said outer edge portions, means for introducing pressurized fluid to said annular gap for displacing said discs and stretching said flexible wall means in opposite directions of said hub axis, said other of said clutch members surrounding said friction lining means and being engageable thereby for frictionally locking therewith when said discs are displaced in said opposite directions of said hub axis, and a pair of rigid annular rings fixed to adjacent faces of said outer edge portions, said flexible wall means comprising a pair of flexible bands, one of said bands extending between and fixed to the inner peripheries respectively of said ring pair and the other of said bands extending between and fixed to the outer peripheries respectively of said ring pair.

6. A shaft clutch assembly including a pair of clutch members, one of said clutch members comprising a hub having a longitudinal axis, a pair of flexible annular discs located in spaced face to face relation to each other so as to define an annular gap therebetween, said annular discs having a respective inner edge portion fixed to said hub and a respective outer edge portion and being yieldable in the direction of the hub axis and in directions radial thereto, flexible wall means extending between said outer edge portions of said discs and closing said annual gap, friction lining means mounted on said outer edge portions, and means for introducing pressurized fluid to said annular gap for displacing said discs from a non-clutching to a clutching position and simultaneously stretching said flexible wall means in opposite directions of said hub axis, said other of said clutch members surrounding said friction lining means and being engageable thereby in said clutching position of said discs for frictionally locking therewith, said discs being prestressed for assuming said non-clutching position when said annular gap is free of the disc-displacing pressurized fluid.

References Cited

UNITED STATES PATENTS

| 1,777,810 | 10/1930 | Snell | 188—152.86 |
| 1,909,744 | 5/1933 | Berg | 188—152.86 X |
| 2,199,785 | 5/1940 | Dickson | 192—88 X |
| 2,619,212 | 11/1952 | Cardwell et al. | 192—88 |
| 2,765,061 | 10/1956 | Fawick | 192—88 |
| 2,805,744 | 9/1957 | Cardwell et al. | 192—88 |

BENJAMIN W. WYCHE III, *Primary Examiner.*